United States Patent [19]

Taleyarkhan

[11] Patent Number: 4,728,490
[45] Date of Patent: Mar. 1, 1988

[54] FUEL ROD SPACER WITH PERIMETER SCOOPS FOR DIVERTING LIQUID COOLANT FLOW

[75] Inventor: Rusi P. Taleyarkhan, Pittsburgh, Pa.

[73] Assignee: Westinghouse Electric Corp., Pittsburgh, Pa.

[21] Appl. No.: 908,140

[22] Filed: Sep. 17, 1986

[51] Int. Cl.$^4$ .............................................. G21C 3/34
[52] U.S. Cl. ................................... 376/439; 376/443
[58] Field of Search ............... 376/439, 438, 443, 442, 376/448, 444, 352

[56] References Cited

U.S. PATENT DOCUMENTS

| 4,576,786 | 3/1986 | DeMario | 376/439 |
| 4,585,616 | 4/1986 | DeMario | 376/442 |
| 4,649,021 | 3/1987 | Taleyarkhan | 376/444 |

*Primary Examiner*—Donald P. Walsh

[57] ABSTRACT

A BWR fuel assembly having an array of spaced fuel rods, an outer hollow tubular flow channel surrounding the fuel rods so as to direct flow of coolant/moderator fluid therealong, and a hollow central water cross extending through the channel and composed of radially extending members dividing the fuel rods into separate fuel rod mini-bundle subassemblies which each has fuel rod spacers being displaced from one another along the length of the subassembly, includes features on at least one of the spacers of each subassembly which minimize degradation of CHF performance. These features are coolant flow diverting scoops mounted on the outer peripheral strap of the spacer. The scoops are disposed in spaced apart relation along an upstream side of the outer strap so as to extend inwardly along and in spaced relation from an upstream side of respective ones of the terminal end portions of the interleaved inner straps of the spacer which with the outer strap form a ring of perimeter cell openings in the spacer. The scoops also extend within the respective spaces between those of the fuel rods received through the perimeter cell openings and terminate at inner ends being disposed above a border defined by the inner straps which surrounds and separates a group of inner cell openings defined by the interleaved inner straps from the perimeter cell openings. The scoops have flow deflecting portions disposed in inclined relationships across portions of the coolant flow paths to the perimeter cell openings for causing redistribution of flow to the inner cell openings.

13 Claims, 9 Drawing Figures

FUEL ROD SPACER WITH PERIMETER SCOOPS FOR DIVERTING LIQUID COOLANT FLOW

CROSS REFERENCE TO RELATED APPLICATIONS

Reference is hereby made to the following copending U.S. patent applications dealing with related subject matter and assigned to the assignee of the present invention:
1. "Nuclear Fuel Spacer Grid With Improved Outer Straps" by E. E. DeMario, assigned U.S. Ser. No. 473,515 and filed Mar. 9, 1983 (W. E. 51,064).
2. "A Low Pressure Drop Grid For A Nuclear Reactor Fuel Assembly" by David J. Sperhac et al, assigned U.S. Ser. No. 567,448 and filed Dec. 30, 1983 (W. E. 51,417).

BACKGROUND OF THE INVENTION

1. Field of the Invention

The present invention relates generally to fuel assemblies for a nuclear reactor and, more particularly, is concerned with a boiling water reactor (BWR) fuel assembly having at least some fuel rod spacers with perimeter scoops configured to redistribute liquid coolant flow from outer to interior spacer cell locations just upstream of the locations of the spacers so as to avoid dryout along the interior fuel rods and thereby improved overall critical heat flux (CHF) performance of the fuel rod bundle.

2. Description of the Prior Art

Typically, large amounts of energy are released through nuclear fission in a nuclear reactor with the energy being dissipated as heat in the elongated fuel elements or rods of the reactor. The heat is commonly removed by passing a coolant in heat exchange relation to the fuel rods so that the heat can be extracted from the coolant to perform useful work.

In a typical boiling water reactor (BWR) fuel assembly, a bundle of fuel rods are subdivided into four separate mini-bundles by a central water cross and each mini-bundle is supported in laterally spaced-apart relation by a plurality of axially displaced grids or spacers, for example six in number, axially spaced apart along its fuel rods. The spacers are needed to maintain the desired fuel mini-bundle configuration. Then, all four mini-bundles of the fuel assembly are encircled by an outer tubular channel having a generally rectangular cross-section. The outer flow channel extends along substantially the entire length of the fuel assembly and interconnects a top nozzle with a bottom nozzle. The bottom nozzle fits into the reactor core support plate and serves as an inlet for coolant flow into the outer channel of the fuel assesmbly. Coolant enters through the bottom nozzle and thereafter flows along the fuel rods removing energy from their heated surfaces. Such BWR fuel assembly is illustrated and described in U.S. Pat. No. 4,560,532 to Barry et al.

The critical heat flux (CHF) performance of a BWR fuel assembly is of paramount importance in the safe operation of a BWR. Upon occurrence of a CHF condition, the surface heat transfer coefficient drops by a large amount, leading to an exponential rise in fuel rod cladding temperature. This can cause rupture and release of fission fragments into the coolant. In order to avoid this condition, regulatory guidelines restrict BWR operation to a low enough level to avoid the CHF condition.

With respect to a BWR fuel assembly like that of the aforementioned patent, it has been realized that CHF performance is highest for fuel rods in the corner and side, or perimeter, spacer locations and lowest for fuel rods in the interior locations. This is due primarily to the hotter steam of the two-phase coolant tending to drift towards the interior fuel rod locations while the cooler liquid of the two-phase coolant accumulates at the channel along the perimeter fuel rod locations. As a result, premature dryout and degradation of CHF performance occurs at the interior fuel rod locations.

Consequently, a need exists to improve CHF performance at the interior fuel rod locations so as to enhance the overall CHF performance of the fuel assembly. While turbulence generating mixing vanes have been employed heretofore on PWR fuel assembly spacers to achieve mixing and homogenization of flowing coolant, for example as disclosed in the above cross-referenced applications and in U.S. Pat. Nos. to Andrews et al (3,379,619) and Tong et al (3,395,077) being assigned to the assignee of the present invention, none are viewed as particularly adapted to provide the improvement being sought herein.

SUMMARY OF THE INVENTION

The present invention provides features which are designed to satisfy the aforementioned needs. Underlying the present invention is the realization that a more even distribution of liquid coolant within the mini-bundles, especially to the interior rod locations for the top three CHF limited spacers, would lead to the interior rods exhibiting enhanced CHF performance similar to the rods at corner and side, or perimeter, spacer locations. Specifically, a plurality of scoops are positioned upstream of the spacers by about three to six inches. The scoops extend in inclined inward relationships between the fuel rods at the locations of the perimeter cells of the spacer. With such an arrangement, the scoops acts to "scoop" or divert liquid coolant flow from the cold walls of the tubular channel to the interior heated rods, where it is needed the most. Due to the improved liquid coolant flow distribution in each mini-bundle, the interior rods can be expected to experience better cooling characteristics. Also, the extensions on the outer strap of the spacer which form part of the scoops increase the longitudinal height of the spacer outer strap so as to impart greater structural rigidity to the spacer. The seismic characteristics of the fuel assembly would thus tend to be improved.

Accordingly, the present invention is directed to an improved fuel rod spacer for use in a nuclear reactor fuel assembly containing a plurality of elongated fuel rods. The improved spacer includes: (a) inner means defining a plurality of inner cell openings for receiving therethrough respective ones of the fuel rods in spaced apart and generally parallel extending relation, the inner means having outer spaced apart terminal end portions; (b) outer peripheral means attached to the respective outer terminal end portions of the inner means to define a number of perimeter cell openings for receiving therethrough other ones of the fuel rods in spaced apart and generally parallel extending relation, the perimeter cell openings being arranged to encompass the inner cell openings as a group, the inner means defining a border which surrounds the inner cell openings as a group and separates them from the perimeter cell openings; and (c)

a plurality of coolant flow diverting scoops mounted on the outer peripheral means in spaced apart relation and along a common side thereof so as to extend inwardly along and in spaced relation from a common side of respective ones of the inner means terminal end portions and within the respective spaces between the other ones of the fuel rods when received trough the perimeter cell openings, the scoops terminating at inner ends being disposed generally above the border defined by the inner means.

More particularly, the inner means is a plurality of inner interleaved straps having the terminal end portions and arranged in an egg-crate configuration to define the plurality of inner cell openings. The outer peripheral means is an outer peripheral strap attached to the respective terminal end portions of the inner straps to define the perimeter cell openings. The inner straps define the border which surrounds the inner cell openings as a group and separates them from the perimeter cell openings. The plurality of coolant flow diverting scoops are mounted on the outer peripheral strap. Each scoop includes a mounting portion and a flow deflecting portion. The mounting portion of each scoop is in the form of an extension of the outer peripheral strap which extends from an upstream side thereof generally parallel to the fuel rods when received in the perimeter cell openings. The flow deflecting portion of each scoop defines the inner end of the scoop and is connected at an outer end to the mounting portion. The outer end of the flow deflecting portion is spaced farther from a respective one of the inner strap terminal end portions than the inner end thereof such that the flow deflecting portion extends in an inclined relation thereto and across a portion of the coolant flow path through the perimeter cell openings. The flow deflecting portion also has a longitudinally-extending tapered and arcuate shape.

These and other advantages and attainments of the present invention will become apparent to those skilled in the art upon a reading of the following detailed description when taken in conjunction with the drawings wherein there is shown and described an illustrative embodiment of the invention.

BRIEF DESCRIPTION OF THE DRAWINGS

In the course of the following detailed description, reference will be made to the attached drawings in which.

DETAILED DESCRIPTION OF THE INVENTION

In the following description, like reference characters designate like or corresponding parts throughout the several views of the drawings. Also in the following description, it is to be understood that such terms as "forward", "rearward", "left", "right", "upwardly", "downwardly", and the like are words of convenience and are not to be construed as limiting terms.

In General

Referring now to the drawings, and particularly to FIGS. 1 to 7, there is shown a nuclear fuel assembly, generally designated 10, for a BWR to which the improved features of the present invention can be advantageously applied. The fuel assembly 10 includes an elongated outer tubular flow channel 12 that extends along substantially the entire length of the fuel assembly 10 and interconnects an upper support fixture or top nozzle 14 with a lower base or bottom nozzle 16. The bottom nozzle 16 which seves as an inlet for coolant flow into the outer channel 12 of the fuel assembly 10 includes a plurality of legs 18 for guiding the bottom nozzle 16 and the fuel assembly 10 into a reactor core support plate (not shown) or into fuel storage racks, for example in a spent fuel pool.

Figure 1:
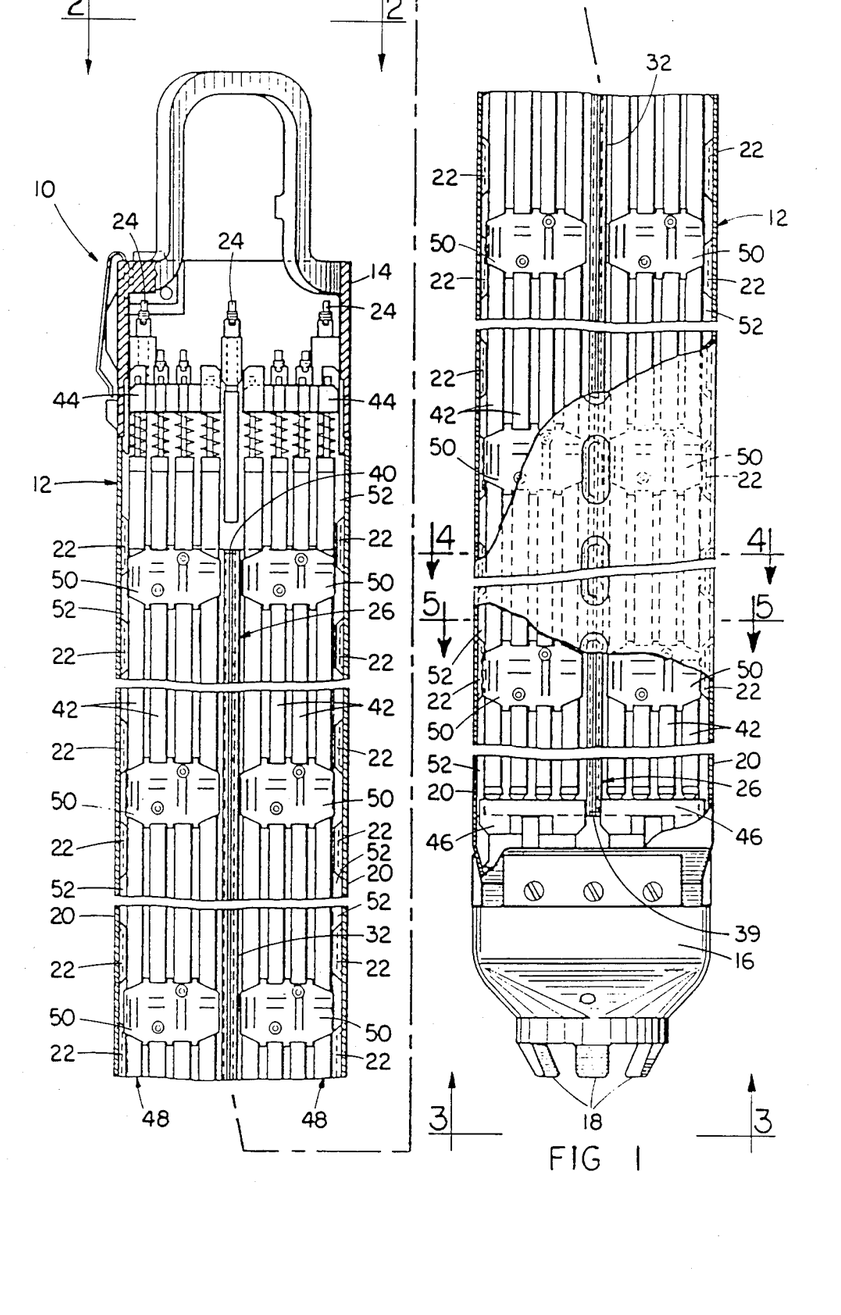
FIG. 1 is an elevational view, with parts broken away and sectioned for clarity, of a BWR nuclear fuel assembly.
Figure 2:
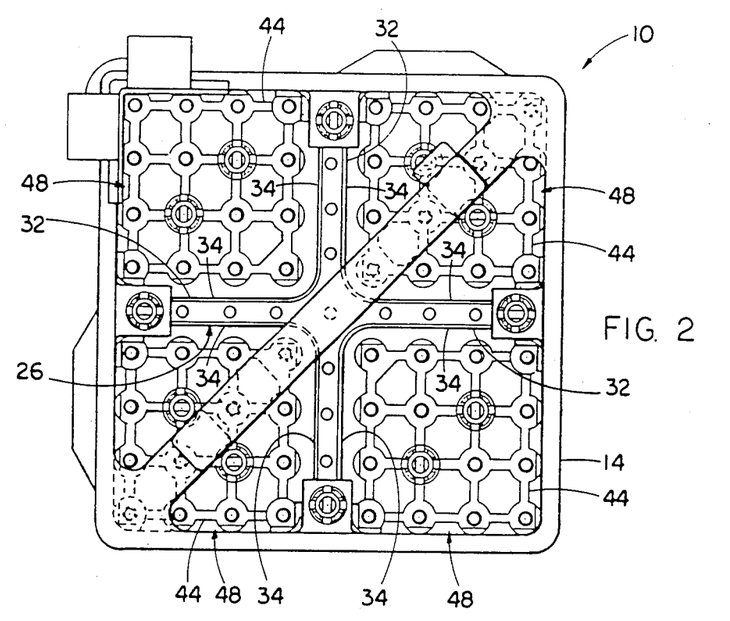
FIG. 2 is an enlarged top plan view of the BWR fuel assembly as seen along line 2—2 of FIG. 1.
Figure 3:
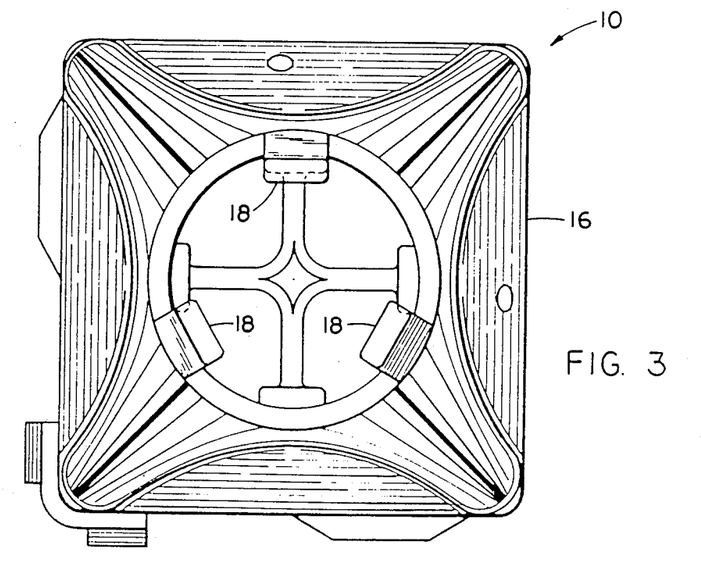
FIG. 3 is an enlarged bottom plan view of the BWR fuel assembly as seen along line 3—3 of FIG. 1.

The outer flow channel 12 generally of rectangular cross-section is made up of four interconnected vertical walls 20 each being displaced about ninety degrees one from the next. Formed in a spaced apart relationship in, and extending in a vertical row at a central location along, the inner surface of each wall 20 of the outer flow channel 12, is a plurality of structural ribs 22. The outer flow channel 12, and thus the ribs 22 formed therein, are preferably formed from a metal material, such as an alloy of zirconium, commonly referred to as Zircaloy. Above the upper ends of the structural ribs 22, a plurality of upwardly-extending attachment studs 24 fixed on the walls 20 of the outer flow channel 12 are used to interconnect the top nozzle 14 to the channel 12.

Figure 4:
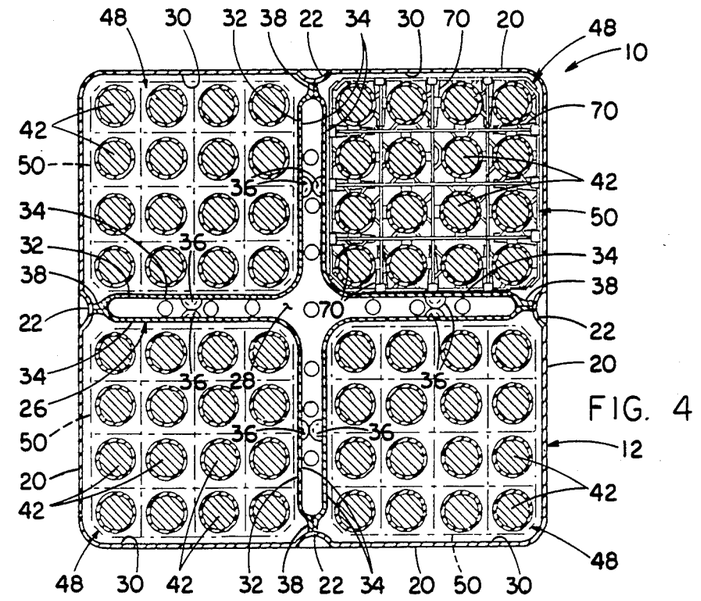
FIG. 4 is a cross-sectional view of the BWR fuel assembly taken along line 4—4 of FIG. 1, showing the fuel rod bundle of the fuel assembly being separated into separate mini-bundles by the water cross with a spacer surrounding one of the mini-bundles being shown in full, while the spacers surrounding the other three mini-bundles are shown in outline form and also showing the flow diverting scoops of the present invention located about the perimeter of the spacer.
Figure 5:
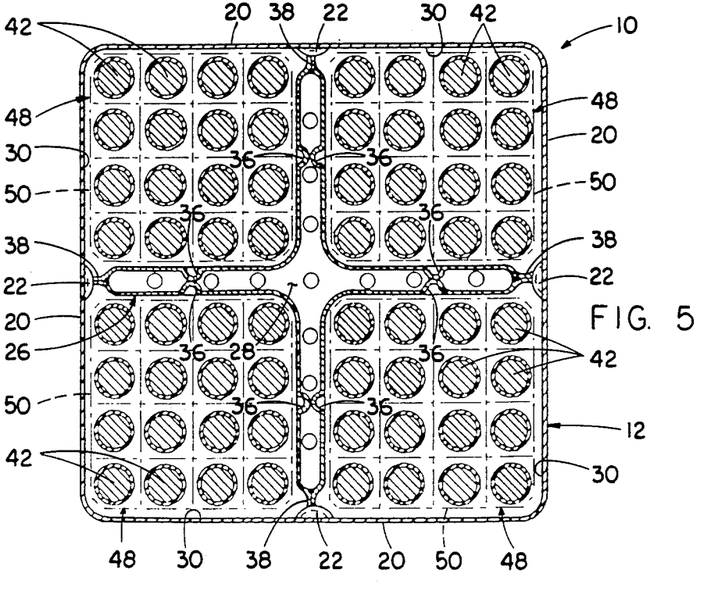
FIG. 5 is another cross-sectional view of the BWR fuel assembly similar to that of FIG. 4, but taken along line 5—5 of FIG. 1.

For improving neutron moderation and economy, a hollow water cross, generally designated 26, extends axially through the outer channel 12 so as to provide an open inner channel 28 for subcooled moderator flow through the fuel assembly 10 and to divide the fuel assembly into four, separate, elongated compartments 30. The water cross 26 has a plurality of four radial panels 32 composed by a plurality of four, elongated, generally L-shaped, metal angles or sheet members 34 that extend generally along the entire length of the channel 12 and are interconnected and spaced apart by a series of elements in the form of dimples 36 formed in the sheet members 34 of each panel 32 and extending therebetween. The dimples 36 are provided in opposing pairs that contact each other along the lengths of the sheet members 34 to maintain the facing portions of the members in a proper spaced-apart relationship. The pairs of contacting dimples 36 are connected together such as by welding to ensure that the spacing between the sheet members 34 forming the panels 32 of the central water cross 26 is accurately maintained.

The hollow water cross 26 is mounted to the angularly-displaced walls 20 of the outer channel 12. Preferably, the outer, elongated longitudinal edges 38 of the panels 32 of the water cross 26 are connected such as by welding to the structural ribs 22 along the lengths thereof in order to securely retain the water cross 26 in its desired central position within the fuel assembly 10. Further, the inner ends of the panels together with the outer ends thereof define the inner central cruciform channel 28 which extends the axial length of the hollow water cross 26. Also, the water cross 26 has a lower flow inlet end 39 and an opposite upper flow outlet end 40 which each communicate with the inner channel 28 for providing subcoolant flow therethrough.

Disposed within the channel 12 is a bundle of fuel rods 42 which, in the illustrated embodiment, number sixty-four and form an 8×8 array. The fuel rod bundle is, in turn, separated into four mini-bundles thereof by the water cross 26. The fuel rods 42 of each mini-bundle, such being sixteen in number in a 4×4 array, extend in laterally spaced apart relationship between an upper tie plate 44 and a lower tie plate 46 and connected together with the tie plates comprise a separate fuel rod subassembly 48 within each of the compartments 30 of the channel 12. A plurality of grids or spacers 50 axially spaced along the fuel rods 42 of each fuel rod subassembly 48 maintain the fuel rods in their laterally spaced relationship. Coolant flow paths and cross-flow communication are provided between the fuel rod subassemblies 48 in the respective separate compartments 30 of the fuel assembly 10 by a plurality of openings 52 formed between each of the structural ribs 22 along the lengths thereof. Coolant flow through the openings 52 serves to equalize the hydraulic pressure between the four separate compartments 30, thereby minimizing the possibility of thermal hydrodynamic instability between the separate fuel rod subassemblies 48.

Figure 6:
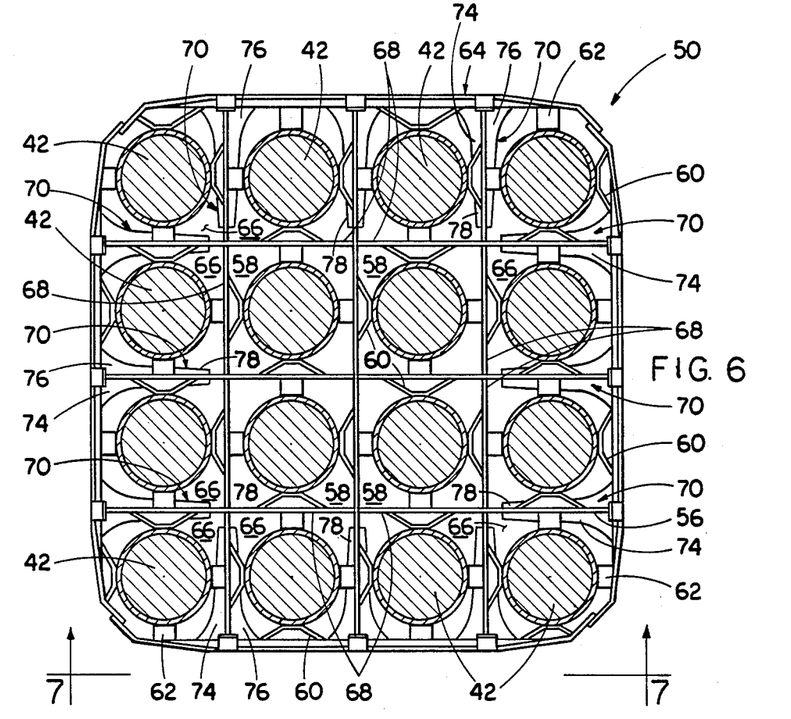
FIG. 6 is an enlarged top plan view of the upper right hand spacer and fuel rod mini-bundle which extends through the spacer as seen in FIG. 4, showing the flow diverting scoops in greater detail.
Figure 7:
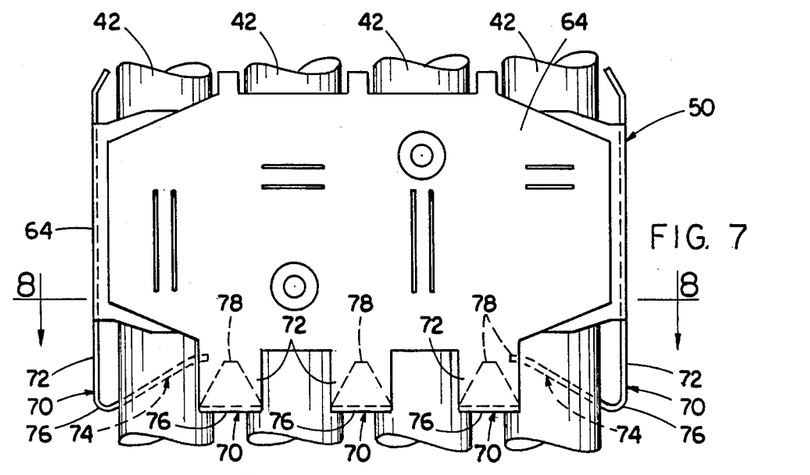
FIG. 7 is a side elevational view of the fuel rod mini-bundle and the spacer with its flow diverting scoops as seen along line 7—7 of FIG. 6.
Figure 8:
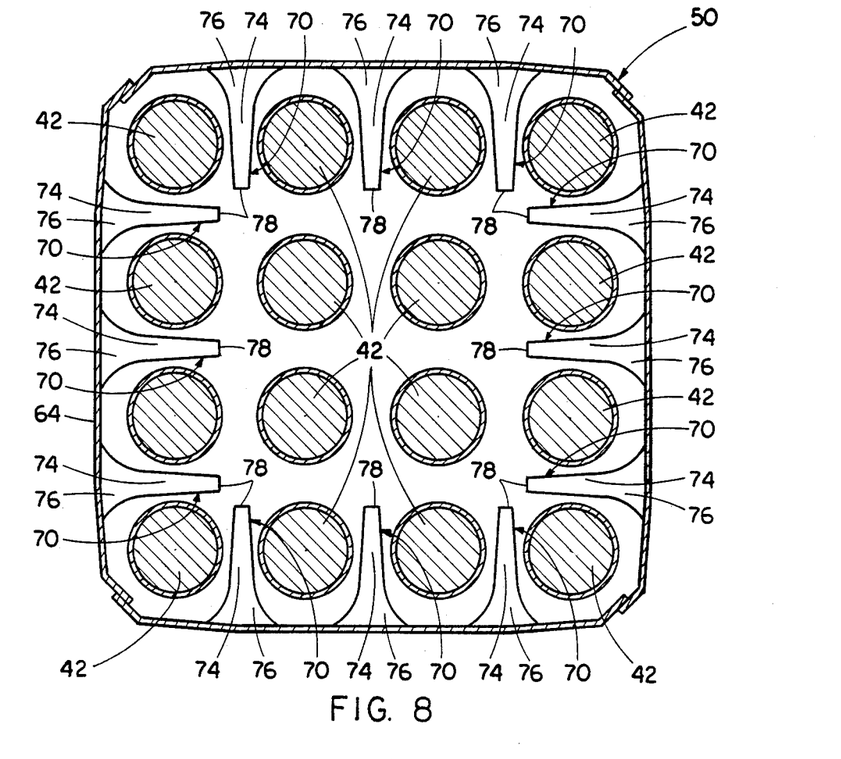
FIG. 8 is a cross-sectional view of the fuel rod mini-bundle and the spacer with its flow diverting scoops as seen along line 8—8 of FIG. 7.

As seen generally in FIG. 4 and in greater detail in FIGS. 6–8, each spacer 50 includes a plurality of interleaved inner straps 54 having opposite terminal end portions 56 and being arranged in an egg-crate configuration to define a plurality of inner cell openings 58. Dimples 60 and springs 62 are formed in the straps 54 so as to project into the inner cell openings 58 and hold respective ones of the fuel rods 42 received therethrough in spaced apart and generally parallel extending relation to one another. The spacer 50 also includes an outer peripheral strap 64 attached to the respective terminal end portions 56 of the inner straps 54 so as to define a number of perimeter cell openings 66 into which others of the dimples 60 and springs 62, also being formed in the outer strap, extend to hold other ones of the fuel rods 42 in the spaced apart parallel relation. The perimeter cell openings 66 are arranged in the form of a ring which encompasses the inner cell openings 58 as a group. Portions of the inner straps 54 define a border, generally indicated as 68, which surrounds the group of inner cell openings 58 and separates them from the perimeter cell openings 66.

The above-described basic components of the BWR fuel assembly 10 are known in the prior art, such as in the fuel assembly disclosed in the patent to Barry et al cited above, and have been discussed in sufficient detail herein to enable one skilled in the art to understand the feature of the present invention presented hereinafter. For a more detailed description of the construction of the BWR fuel assembly, attention is directed to the above-mentioned Barry et al patent.

Improved Spacer for Avoiding CHF Performance Degradation

The present invention provides improved features at least in the limiting CHF ones of the spacers 50 (i.e., the uppermost three spacers) of the fuel assembly 10. Referring to FIGS. 4 and 6–9, these features comprise a plurality of coolant flow diverting scoops 70 mounted on the outer peripheral strap 64. Basically, each of the scoops 70 is composed of a mounting portion 72 and a coolant flow deflecting portion 74 connected at its outer end 76 to the lower end of the mounting portion.

Figure 9:
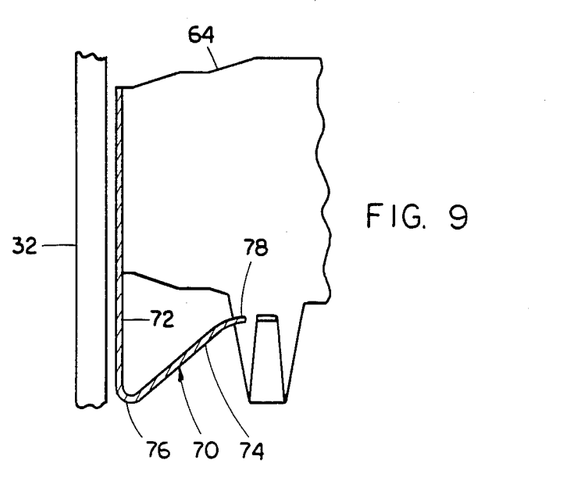
FIG. 9 is an enlarged fragmentary view of the lower left corner of the spacer of FIG. 4.

The mounting portions 72 of the scoops 70 are in the form of flat extensions of the respective spacer outer strap 64 which extend downwardly therefrom, for instance from three to six inches, and generally parallel to the fuel rods 42 and are disposed in laterally spaced apart relation from one another along the upstream side of the spacer 50. The flow deflecting portions 74, having longitudinally tapered and arcuate-shaped configurations, extend inwardly from respective lower ends of the mounting portions 72 within the respective spaces between the ones of the fuel rods 42 received through the perimeter cell openings 66 of the spacer 50. Also, the flow deflecting portions 74 of the scoops 70 extend along and in spaced relation downwardly from the upstream side of the spacer 50 and particularly from the respective ones of the terminal end portions 56 of the inner straps 54. The flow deflecting portions 74 terminate at inner ends 78 being disposed generally below the border 68, as seen in FIG. 6, defined by portions of the inner straps 54. As depicted in FIGS. 7 and 9, the outer end 76 of the arcuate-shaped flow deflecting portion 74 of each scoop 70 is spaced farther from its respective one of the inner strap terminal end portions 56 than its inner end 78 such that it extends in an inclined relation thereto across the path of a portion of the coolant flowing upwardly toward the perimeter cell openings 66. Such inclined relation of the scoop flow deflecting portion 74 achieves scooping of liquid coolant from along the channel 12 and water cross panels 32 and redistributes it to the fuel rods 42 extending through the inner cell openings 58 of the spacer 50 just upstream of the same. Preferably, at least the three uppermost ones of the spacers 50 have the scoops 70 mounted as just described on their upstream sides.

It is thought that the invention and many of its attendant advantages will be understood from the foregoing description and it will be apparent that varrious changes may be made in the form, construction and arrangement thereof without departing from the spirit and scope of the invention or sacrificing all of its material advantages, the form hereinbefore described being merely a preferred or exemplary embodiment thereof.

What is claimed is:

1. An improved fuel rod spacer for use in a nuclear reactor fuel assembly containing a plurality of elongated fuel rods, said spacer comprising:

(a) inner means defining a plurality of inner cell openings for receiving therethrough respective ones of said fuel rods in spaced apart and generally parallel extending relation, said inner means having outer spaced apart terminal end portions;

(b) outer peripheral means attached to said respective outer terminal end portions of said inner means to define a number of perimeter cell openings for receiving therethrough other ones of said fuel rods in spaced apart and generally parallel extending relation, said perimeter cell openings being arranged to encompass said inner cell openings as a group, said inner means defining a border which surrounds said inner cell openings as a group and separates them from said perimeter cell openings; and (c) a plurality of coolant flow diverting scoops mounted on said outer peripheral means in spaced apart relation and along a common coolant flow receiving side thereof so as to extend inwardly along and in spaced relation from a common coolant flow receiving side of respective ones of said inner means terminal end portions and within the respective spaces between said other ones of said fuel rods when received through said perimeter cell openings, said scoops terminating at inner ends being disposed generally proximate said border defined by said inner means;

(d) said each scoop including a mounting portion and a flow deflecting portion, said mounting portion being attached to said outer peripheral means, said flow deflecting portion including said inner end of said scoop and being connected at an outer end to said mounting portion, said outer end of said flow deflecting portion being spaced farther from a respective one of said inner means terminal end portions than said inner end of said flow deflecting portion such that said flow deflecting portion extends from said mounting portion of said scoop in an inclined relation and toward said respective one of said inner means terminal end portions.

2. The improved spacer as recited in claim 1, wherein said mounting portion extends away from said side of said peripheral means generally parallel to said fuel rods when received in said perimeter cell openings.

3. The improved spacer as recited in claim 1, wherein said flow deflecting portion has a longitudinally-extending tapered shape.

4. The improved spacer as recited in claim 1, wherein said flow deflecting portion has a longitudinally-extending arcuate shape.

5. An improved fuel rod spacer for use in a nuclear reactor fuel assembly containing a plurality of elongated fuel rods, said spacer comprising:

(a) a plurality of interleaved inner straps having terminal end portions and arranged in an egg-crate configuration in defining a plurality of inner cell openings for receiving therethrough respective ones of said fuel rods in spaced apart and generally parallel extending relation;

(b) an outer peripheral strap attached to said respective terminal end portions of said inner straps to define a number of perimeter cell openings for receiving therethrough other ones of said fuel rods in spaced apart and generally parallel extending relation, said perimeter cell openings being arranged to encompass said inner cells openings as a group, said inner straps defining a border which surrounds said inner cell openings as a group and separates them from said perimeter cell openings; and (c) a plurality of coolant flow diverting scoops mounted on said outer peripheral strap in spaced apart relation and along a common coolant flow receiving side thereof so as to extend inwardly along and in spaced relation from a common coolant flow receiving side of respective ones of said inner strap terminal end portions and within the respective spaces between said outer ones of said fuel rods when received through said perimeter cell openings, said scoops terminating at inner ends being disposed generally proximate said border defined by said inner straps;

(d) said each scoop including a mounting portion and a flow deflecting portion, said mounting portion being in the form of an extension of said outer peripheral strap, said flow deflecting portion including said inner end of said scoop and being connected at an outer end to said mounting portion, said outer end of said flow deflecting portion being spaced farther from a respective one of said inner strap terminal end portions than said inner end of said flow deflecting portion such that said flow deflecting portion extends from said mounting portion of said scoop in an inclined relation and toward said respective one of said inner strap terminal end portions.

6. The improved spacer as recited in claim 5, wherein said mounting portion of said each scoop extends away from said side of said peripheral strap generally parallel to said fuel rods when received in said perimeter cell openings.

7. The improved spacer as recited in claim 5, wherein said flow deflecting portion has a longitudinally-extending tapered shape.

8. The improved spacer as recited in claim 5, wherein said flow deflecting portion has a longitudinally-extending arcuate shape.

9. In a fuel assembly having an array of spaced fuel rods, an outer hollow tubular flow channel surrounding said fuel rods so as to direct flow of coolant/moderator fluid therealong and a water cross extending through said channel and having a plurality of radially extending members dividing said array of fuel rods into a plurality of separate fuel rod mini-bundle subassemblies, each subassembly having a plurality of spacers being displaced from one another along the length of said subassembly between the bottom and top thereof and surrounding said fuel rods thereof so as to maintain them in side-by-side spaced relationship, at least one of said spacers being an improved spacer comprising:

(a) a plurality of interleaved inner straps having terminal end portions and arranged in an egg-crate configuration to define a plurality of inner cell openings which receive therethrough respective ones of said fuel rods in spaced apart and generally parallel extending relation;

(b) an outer peripheral strap attached to said respective terminal end portions of said inner straps to define a number of perimeter cell openings which receive therethrough other ones of said fuel rods in spaced apart and generally parallel extending relation, said perimeter cell openings being arranged to encompass said inner cell openings as a group, said inner straps defining a border which surrounds said inner cell openings as a group and separates them from said perimeter cell openings; and (c) a plurality of coolant flow diverting scoops mounted on said outer peripheral strap in spaced apart relation and along an upstream side thereof so as to extend inwardly along and in spaced relation from an upstream side of respective ones of said inner strap terminal end portions and within the respective spaces between said other ones of said fuel rods received through said perimeter cell openings, said scoops terminating at inner ends being disposed generally below said border defined by said inner straps;

(d) said each scoop including a mounting portion and a flow deflecting portion, said mounting portion being in the form of an extension of said outer peripheral strap, said flow deflecting portion including said inner end of said scoop and being connected at an outer end to said mounting portion, said outer end of said flow deflecting portion being spaced farther from a respective one of said inner strap terminal end portions than said inner end of said flow deflecting portion such that said flow deflecting portion extends from said mounting potion of said scoop in an inclined relation thereto, toward said respective one of said inner strap terminal end portions and across the path of a portion of the coolant flow toward said perimeter cell openings.

10. The fuel assembly as recited in claim 9, wherein said mounting portion of said each scoop extends away from said upstream side of said peripheral strap generally parallel to said fuel rods when received in said perimeter cell openings.

11. The fuel assembly as recited in claim 9, wherein said flow deflecting portion has a longitudinally-extending tapered shape.

12. The fuel assembly as recited in claim 9, wherein said flow deflecting portion has a longitudinally-extending arcuate shape.

13. The fuel assembly as recited in claim 9, wherein at least the three uppermost ones of said spacers are in the form of said improved spacer.

* * * * *